(12) United States Patent
Wilensky et al.

(10) Patent No.: US 7,454,087 B1
(45) Date of Patent: Nov. 18, 2008

(54) IMAGE BLENDING USING LINEAR BLENDS OF CORRESPONDING NEIGHBORHOOD MEANS AND VARIANCES FROM FIRST AND SECOND IMAGE REGIONS

(75) Inventors: Gregg D. Wilensky, Pacific Palisades, CA (US); Todor G. Georgiev, Campbell, CA (US); Mark Hamburg, Scotts Valley, CA (US)

(73) Assignee: Adobe Systems Incorporated, San Jose, CA (US)

( * ) Notice: Subject to any disclaimer, the term of this patent is extended or adjusted under 35 U.S.C. 154(b) by 47 days.

(21) Appl. No.: 11/623,715

(22) Filed: Jan. 16, 2007

Related U.S. Application Data (62) Division of application No. 10/273,105, filed on Oct. 16, 2002, now Pat. No. 7,171,057.

(51) Int. Cl.
*G06K 9/36* (2006.01)
*G09G 5/00* (2006.01)
(52) U.S. Cl. .................................. 382/284; 345/629
(58) Field of Classification Search ................ 382/263, 382/274, 275, 276, 284, 299, 300; 345/420, 345/589, 592, 629, 648; 348/584, 586
See application file for complete search history.

(56) References Cited

U.S. PATENT DOCUMENTS

| | | | |
|---|---|---|---|
| 4,791,583 A | 12/1988 | Colburn | |
| 5,081,692 A | 1/1992 | Kwon et al. | |
| 5,175,808 A | 12/1992 | Sayre | |
| 5,459,529 A | 10/1995 | Searby et al. | |
| 5,488,674 A | 1/1996 | Burt et al. | |
| 5,844,627 A * | 12/1998 | May et al. ................. | 348/607 |
| 5,982,381 A * | 11/1999 | Joshi et al. ............... | 345/629 |
| 6,028,969 A | 2/2000 | Gielow | |
| 6,038,031 A * | 3/2000 | Murphy ..................... | 382/254 |
| 6,075,905 A * | 6/2000 | Herman et al. ............ | 382/284 |
| 6,078,701 A * | 6/2000 | Hsu et al. .................. | 382/294 |
| 6,097,854 A * | 8/2000 | Szeliski et al. ............ | 382/284 |
| 6,208,351 B1 | 3/2001 | Brog et al. | |
| 6,226,418 B1 | 5/2001 | Miller et al. | |
| 6,266,044 B1 | 7/2001 | Liquori | |
| 6,269,196 B1 | 7/2001 | Hamburg | |
| 6,331,860 B1 | 12/2001 | Knox | |
| 6,348,953 B1 | 2/2002 | Rybczynski | |
| 6,396,959 B1 | 5/2002 | Hamburg | |
| 6,421,460 B1 | 7/2002 | Hamburg | |
| 6,567,096 B1 | 5/2003 | Oka et al. | |
| 6,597,819 B1 | 7/2003 | Ito | |
| 6,665,450 B1 | 12/2003 | Cornog et al. | |

(Continued)

FOREIGN PATENT DOCUMENTS

WO     WO01/40490     6/2001

*Primary Examiner*—Kanji Patel
(74) *Attorney, Agent, or Firm*—Fish & Richardson P.C.

(57) ABSTRACT

Systems and techniques for blending image data such that noise, texture and/or high-frequency data may be better preserved in a resulting blended image. In general, in one implementation, the techniques include combining a first image region and a second image region to form a blended image region having a neighborhood mean and a neighborhood variance, at each of multiple points in the blended image region, that are linear blends of corresponding neighborhood means and variances from the first and second image regions using a common blending parameter.

8 Claims, 5 Drawing Sheets

U.S. PATENT DOCUMENTS

| | | |
|---|---|---|
| 6,697,062 B1 * | 2/2004 | Cabral et al. ................. 345/419 |
| 6,778,207 B1 * | 8/2004 | Lee et al. ...................... 348/36 |
| 6,825,852 B1 | 11/2004 | Hamburg |
| 7,085,409 B2 * | 8/2006 | Sawhney et al. ............ 382/154 |
| 7,154,515 B2 | 12/2006 | Donahue et al. |
| 7,219,114 B2 | 5/2007 | Budge |

* cited by examiner

| 0.0 | 0.0 | 0.1 | 0.2 | 0.3 | 0.2 | 0.1 | 0.0 | 0.0 |
|-----|-----|-----|-----|-----|-----|-----|-----|-----|
| 0.0 | 0.2 | 0.4 | 0.5 | 0.6 | 0.5 | 0.4 | 0.2 | 0.0 |
| 0.1 | 0.4 | 0.7 | 0.8 | 0.9 | 0.8 | 0.7 | 0.4 | 0.1 |
| 0.2 | 0.5 | 0.8 | 1.0 | 1.0 | 1.0 | 0.8 | 0.5 | 0.2 |
| 0.3 | 0.6 | 0.9 | 1.0 | 1.0 | 1.0 | 0.9 | 0.6 | 0.3 |
| 0.2 | 0.5 | 0.8 | 1.0 | 1.0 | 1.0 | 0.8 | 0.5 | 0.2 |
| 0.1 | 0.4 | 0.7 | 0.8 | 0.9 | 0.8 | 0.7 | 0.4 | 0.1 |
| 0.0 | 0.2 | 0.4 | 0.5 | 0.6 | 0.5 | 0.4 | 0.2 | 0.0 |
| 0.0 | 0.0 | 0.1 | 0.2 | 0.3 | 0.2 | 0.1 | 0.0 | 0.0 |

510 — Kernel
```
 0  -1   0
-1   4  -1
 0  -1   0
```
Kernel
Divisor = 4

520 — Kernel
```
0  1  0
1  0  1
0  1  0
```
Kernel
Divisor = 4

530 — Kernel
```
-1  -1  -1
-1   8  -1
-1  -1  -1
```
Kernel
Divisor = 8

FIG. 6

IMAGE BLENDING USING LINEAR BLENDS OF CORRESPONDING NEIGHBORHOOD MEANS AND VARIANCES FROM FIRST AND SECOND IMAGE REGIONS

CROSS-REFERENCE TO RELATED APPLICATIONS

This application is a divisional (and claims the benefit of priority under 35 USC 120) of U.S. patent application Ser. No. 10/273,105, entitled IMAGE BLENDING USING NON-AFFINE INTERPOLATION, filed on Oct. 16, 2002, now U.S. Pat. No. 7,171,057 which is commonly assigned and the contents of which are incorporated herein by reference in its entirety.

BACKGROUND OF THE INVENTION

The present application describes systems and techniques relating to blending of image data, for example, blending of digital image data from one image region with digital image data from another image region.

Traditional techniques for blending image regions typically produce a new intensity value, I3, based on two original values, I1 and I2, and a scalar blending parameter, $\beta$, which ranges from zero to one. Frequently, the blending function is required to yield I1 when $\beta$ equals zero and I2 when $\beta$ equals one, and to produce a continuous range of intermediate intensity values for intermediate values of $\beta$. This type of blending is also known as interpolation. For example, a linear interpolation function can be:

$$\text{blend}(I1,I2,\beta)=(1-\beta)I1+\beta I2. \quad (1)$$

The blend coefficients, $(1-\beta)$ and $\beta$, satisfy the blending function requirements and create a resulting blended image for varying values of the blending parameter, $\beta$, that is a simple linear blend of the original image regions.

The image regions that can be blended with such traditional techniques include image portions from one or more images and images from multiple layers forming a composite image. For example, the Clone Stamp tool in Photoshop® software, provided by Adobe Systems Incorporated of San Jose, Calif., blends a portion of an image with another portion of the same image, or with a portion of another image. Various modes are available for combining data from two image regions, ranging from complete replacement of destination pixels by source pixels to linear and nonlinear techniques for graded combinations of source and destination image regions (e.g., a soft edge on a clone brush). Thus, a transition region can be defined in which the blended image data transitions from entirely source pixel data to entirely destination pixel data, with blended data there between.

Blending can also be performed on image data having multiple color components. When mixing data from one image region into another image region, color values typically blend smoothly, but other aspects of the image data may not. For example, noise characteristics of the image regions tend to cancel each other out, thereby creating artifacts in a resulting blended image that the human eye can detect. In the context of the Clone Stamp tool, an apparent halo can be produced around the cloned region, where mismatched noise characteristics are apparent to the eye, such as from noise cancellation.

Laplacian blending is a traditional technique that attempts to address noise cancellation issues by breaking the original images up into higher and lower frequency components and blending the higher frequency components over a shorter distance in the transition region. This can be represented by using a blending function:

$$L\_\text{blend}(I1,I2,\beta)=(1-F(\beta))I1+F(\beta)I2, \quad (2)$$

where F(x) is a contrast increasing function for blending the high-frequency components. The function F(x) forces blending to smaller regions, for higher frequencies. This will result in a faster transition in the high-frequency components and thereby reduce the size of any region affected by noise cancellation while still allowing a gradual overall transition. This can be extended to more than two frequency components by using different functions F for each component.

Moreover, interpolation can be performed in a different space. For example, if a function F maps the image data into another space and a function G is the inverse of F, an interpolation function can work in the space of the mapped data, and a new interpolation function can be as follows:

$$G\_\text{blend}(I1,I2,\beta)=G((1-\beta)F(I1)+\beta F(I2)). \quad (3)$$

Gamma compensated blending is an example of this.

SUMMARY OF THE INVENTION

In general, in one aspect, the invention involves blending a first image and a second image to form a blended image including a blended image component formed by a non-affine interpolation of components from the first and second images. The non-affine interpolation can be a spherical interpolation of components from a first image region and a second image region to form a blended image component in a blended image region. In a related aspect, the invention involves combining a first image region and a second image region to form a blended image region having a neighborhood mean and a neighborhood variance, at each of multiple points in the blended image region, that are linear blends of corresponding neighborhood means and variances from the first and second image regions using a common blending parameter. Combining the first image region and the second image region can involve forming a blended image region having, at each point in the blended image region, a neighborhood mean and a neighborhood variance that are linear blends using the common blending parameter.

In another related aspect, the invention involves blending a first image component corresponding to a first image region with a second image component corresponding to a second image region to produce a first blended component, blending a third image component corresponding to the first image region with a fourth image component corresponding to the second image region using blend coefficients, which sum to a value other than one, to produce a second blended component, and merging the first blended component with the second blended component to produce a blended image region. The blend coefficients can be derived from a common blending parameter. The blend coefficients can sum to a value greater than one when both of the blend coefficients are non-zero. The blend coefficients can be such that a sum of squares of the blend coefficients will always equal one.

Advantageous implementations of the invention include one or more of the following features. The first, second, third and fourth image components can be obtained using various techniques, the first image component can be first smooth data values for the first image region, the third image component can be first noise data values for the first image region, the second image component can be second smooth data values for the second image region, and the fourth image component can be second noise data values for the second image region. Obtaining the first and third image components can involve generating the first noise data values using pixel values associated with the first image region, and subtracting the first noise data values from data values in the first image region to generate the first smooth data values. Alternatively, obtaining the first and third image components can involve generating the first smooth data values using pixel values associated with the first image region, and subtracting the first smooth data values from data values in the first image region to generate the first noise data values.

Using the pixel values associated with the first image region can include, for a current pixel in the first image region, generating an average pixel value from a neighborhood of pixels associated with the current pixel in the first image region. Subtracting the first smooth data values can involve, for a current pixel in the first image region, selecting a random pixel value from a neighborhood of pixels associated with the current pixel in the first image region, and subtracting from the random pixel value a smooth value from the first smooth data values, where the smooth value correspond to the current pixel in the first image region, to generate a noise value. The pixel values associated with the first image region can be boundary pixel values from boundary pixels that lie outside the first image region, and generating the first smooth data values can involve fitting new pixel values to a predefined function using the boundary pixel values as boundary conditions for the predefined function. Moreover, fitting the new pixel values to the predefined function can involve fitting the new pixel values to a polynomial to model the first image region.

Implementations of the invention may occur in hardware, firmware, software or a combination of these, and may include instructions in a software product tangibly stored on a machine-readable medium, where the instructions are operable to cause a programmable processor to perform the operations described.

The invention can be implemented to realize one or more of the following advantages. Two digital image regions can be blended to produce a resulting image that includes underlying noise/texture characteristics. The blended value at each pixel in a blended region can depend upon neighboring image values. Non-local blending using the techniques described herein can include blending such that a standard deviation of image values and a mean of image values, over a spatial neighborhood around each pixel location, are each respected and incorporated into the resulting blended image region. Moreover, the techniques described can be used in blending other types of data values. Noise artifacts, which are commonly introduced when blending two image regions with traditional blending techniques, can thus be prevented. Moreover, high-frequency image details can be better preserved in a resulting blended image. Thus, noise cancellation issues can be effectively eliminated.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference symbols in the various drawings indicate like elements.

DETAILED DESCRIPTION

Figure 1:
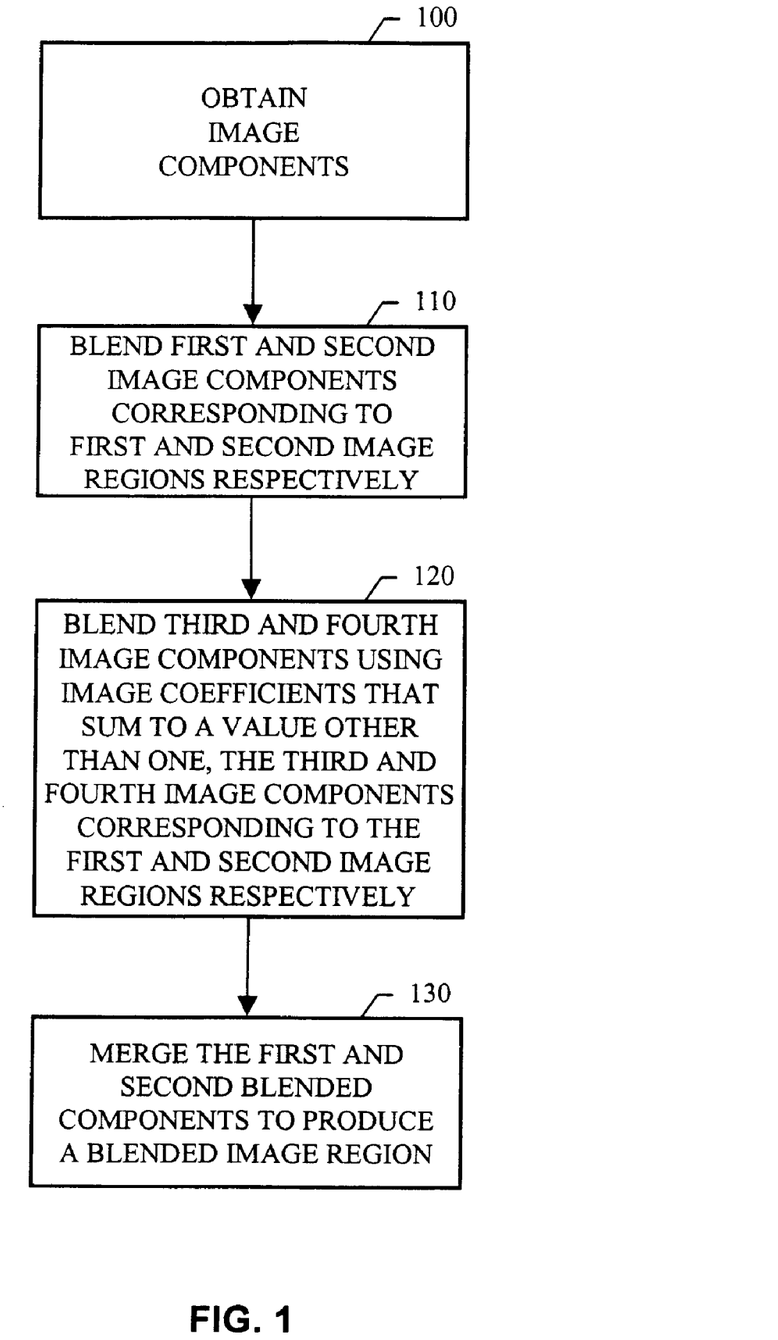
FIG. 1 is a flow chart illustrating a process of blending image data to produce a blended image region.

FIG. 1 is a flow chart illustrating a process of blending image data to produce a blended image region. The process begins by obtaining image components at 100. The image components can be received as input, or generated from image data to be blended together. The image components include at least two image components for an image region to be blended with one or more other image regions. The image region can be a portion of a digital image that can include the whole image, a rectangular region within the image, an arbitrarily shaped connected region within the image, or an arbitrarily shaped unconnected region within the image. Regardless of the form it takes, an image region is also an image.

As used herein, image components generally refer to frequency components. An image can be broken into a sum of frequency components (e.g., a sum of high-frequency and a low-frequency components) using one or more of multiple frequency decomposition techniques. Such techniques include traditional frequency decomposition based on low-pass, high-pass, and band-pass filters or Fourier analysis, and also include any decomposition into a sum of components exhibiting different rates of changes. For example, frequency components can be distinguish from each other in terms of the rate of change of the rate of change (i.e. the second derivative of the image data). If we are evaluating an image region which contains a constant gradient of colors (color values are linearly increasing across the region) then this would be considered as a low frequency component, since it has a small (namely zero) absolute magnitude of the second derivative. On the other hand, the rate of change of values may be high in this region, and so it may be considered high frequency.

Another approach is to produce the "low frequency" component by smoothing the image, either with a Gaussian blur or any other noise-removal or noise-reducing algorithm, such as curvature-based diffusion or median filter. The "high frequency" component, the difference between the original image and the "low frequency" component, is then an estimate of the noise in the image. Note that this version of the "low frequency" image may actually have sharp edges and hence contain high spatial frequencies.

When generating the image components, each image component can be generated independent of other image components; alternatively, the generation of one image component can be made to depend on that of other image components. When two image regions are to be blended together, each image region can have two extracted image components, one of which can be calculated directly from the image data, and the other of which can be calculated based on the image data and the directly calculated component. For example, a directly calculated component can be a high spatial frequency filtered version of the corresponding image region, and the indirectly calculated component can be the difference between the high frequency version and the original image. The image component generation and blending operations can be adjusted and/or intermixed in order to reduce processing time; for example, an indirectly calculated component can be implicitly calculated during the blend. Moreover, the extracted image components can both be calculated directly.

First and second image components are blended together to produce a first blended component at 110. The first and second image components correspond to first and second image regions respectively. Third and fourth image components are blended together using blend coefficients that sum to a value other than one to produce a second blended component at 120. The third and fourth image components correspond to the first and second image regions respectively. At 130, the first and second blended components are merged to produce a blended image region. The order presented in the flow chart is for illustration only; other operation sequences, timing and process flow are possible, including performing the blending operations 110, 120 simultaneously or in reverse order.

For at least one value of an input blending parameter (e.g., a blending parameter received as input, such as from software or a user), the blend coefficients for the third and fourth image components sum to a value other than one. The blend coefficients can be made to sum to a value greater than one when both of the blend coefficients are non-zero. For example, a sum of squares of the blend coefficients can equal one for all possible blend coefficients, given a range of possible blending parameters as input.

Figure 2:
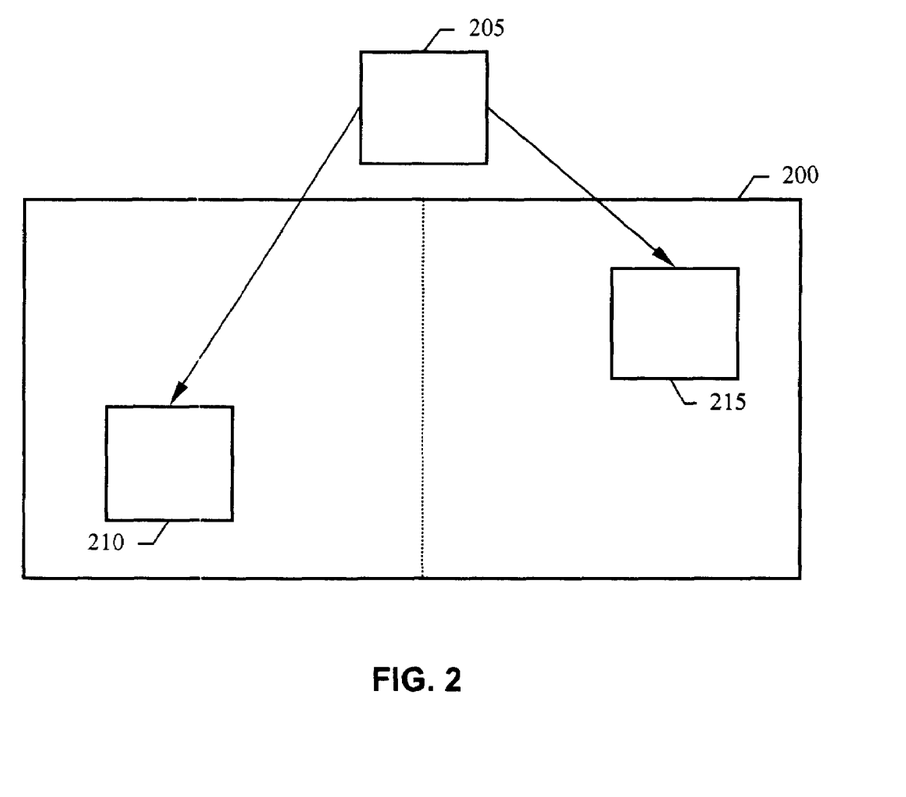
FIG. 2 shows a blending mask and two associated image regions.

FIG. 2 shows a blending mask 205 and two associated image regions 210, 215. The blending mask 205 specifies blending parameters to use in blending image data from a first image region 210 and a second image region 215. The first and second image regions 210, 215 can be from a single image or separate images: one or two images 200. The image data includes image values. An image value (e.g., a pixel value) can be an image intensity associated with a pixel in a grayscale digital image, a color component, such as red, green, or blue for a color image, or a collection of color values associated with a pixel. Thus, the techniques described herein can be applied to multiple color channels.

The blending mask 205 can be any of multiple shapes and sizes. For example, the blending mask 205 can be larger than or equal to the sizes of each of one or two images 200. Such a blending mask can be used to create a gradual transition from one image into another across the whole area of a resulting blended image (e.g., a crossfade image). Alternatively, the blending mask 205 can correspond to a feathered brush tool for use in image cloning (e.g., copying a piece of a source image into a target image region).

Figure 3:
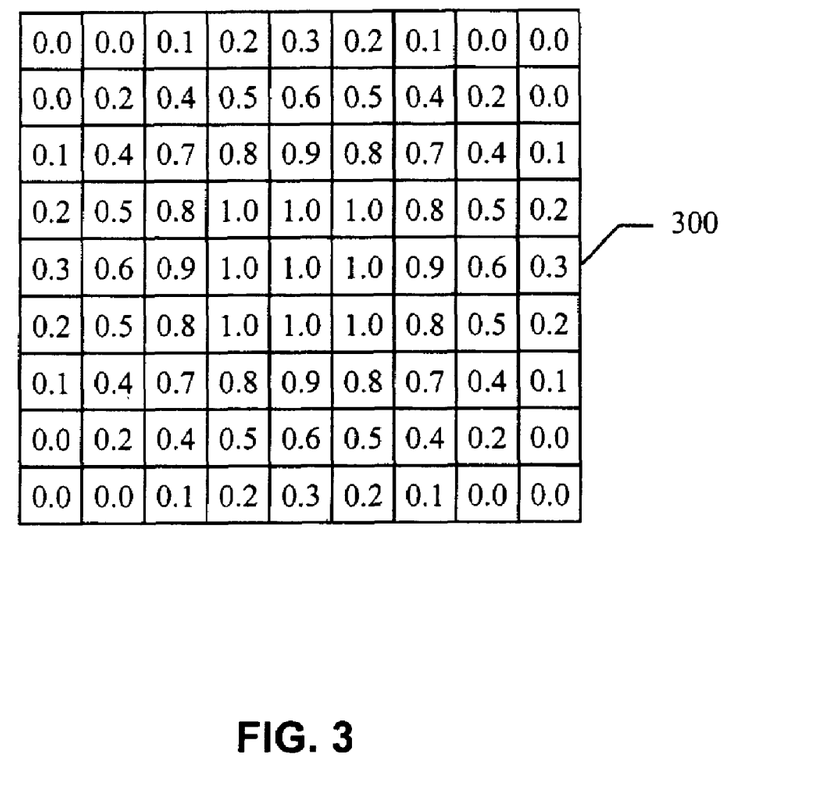
FIG. 3 shows an example blending mask corresponding to a feathered brush for use in image cloning.

FIG. 3 shows an example blending mask 300 corresponding to a feathered brush for use in image cloning. The blending mask 300 specifies multiple blending parameters and includes a center portion in which one hundred percent of the source image is copied into the target image, thus, the blending parameter equals one. Surrounding this center portion are a series of decreasing blending parameters that cause the resulting blended image to make a gradual transition from replacement values being cloned in, and the underlying image. The discussion below frequently refers to blending operations, in the context of image cloning, for the purpose of improving the noise characteristics of a resulting blended image. However, the techniques described herein apply equally to image blending in other contexts. For example, the techniques described here can be used in crossfade image blending, fading between two images in a video presentation, or in interpolation at the edge of a feathered brush tool used in textured healing of an image (for details of textured healing of an image, see the U.S. patent application entitled "Generating Replacement Data Values for an Image Region", filed Nov. 16, 2001, application Ser. No. 09/991,254, now issued U.S. Pat. No. 6,587,592, the disclosure of which is incorporated by reference in its entirety).

In general, a first image region and a second image region can be combined to form a blended image region including a blended image component formed by a non-affine interpolation of components from the first and second image regions. An affine combination is a linear combination of vectors with coefficients that add up to one. An affine interpolation is an interpolation function where the underlying combination (i.e., the point at which weighted elements are summed) is an affine combination. Affine combinations preserve some linear property of the vectors that are combined. For example, if all n vectors are points on a (n−1 dimensional) plane that does not contain zero, then the affine combination is on the same plane. In this way we never get zero (black image), and if all images have the same brightness, the affine combination has the same brightness. If all images have an image detail in common, the affine combination has the same detail, exactly. Affine combinations have been used to preserve brightness in images.

Most blending or interpolation functions at some point perform a weighted sum. The summed values may be processed relative to the inputs to the blending formula and the derivation of the weights relative to the blending parameter may be complicated. Considering the set of valid weights as points in space (2-dimensional space for two-input blending, 3-dimensional space for 3-input blending, etc.), then affine blending functions have valid weight sets forming a line, plane, or hyperplane (depending on the dimensionality), or a connected subset thereof (e.g., a line segment). Non-affine blending functions have valid weight sets that don't form lines, planes, or hyperplanes. In particular, we distinguish the case of spherical blending functions where the valid weight sets form a portion of a circle, sphere, or hypersphere (i.e., spherical interpolation). Thus, in a non-affine interpolation, the weights used in the interpolation (e.g., the blending coefficients) do not always sum to one. Consequently, unlike affine interpolation, combining identical elements using non-affine interpolation will not produce another identical element for all values of the blend parameter.

To improve noise characteristics of a resulting blended image, a first image region and a second image region can be combined to form a blended image region that has a neighborhood mean and a neighborhood variance that are linear blends of corresponding neighborhood means and neighborhood variances from the first and second image regions. A common blending parameter can be used. For example, at each pixel in the blended region, a neighborhood mean and a neighborhood variance can be linear blends, of the neighborhood mean and the neighborhood variance of the source image regions, using a common blending parameter. By blending pixel values in such a way as to preserve mean and variance characteristics of the two source images, noise characteristics of the resulting blended image can be improved. The recombined image can be made to look to the eye like a linear interpolation of both the average values and the variance values of the source images, and as a result, the eye is not drawn to the transition region.

Noise is a non-local property of an image. As used herein, the term noise includes high-frequency image data that actually corresponds to the abstract image being represented (e.g., eyelashes, grass or other actual high-frequency image details), film grain, and other image texture that may not generally be thought of as noise. Variance in image values over a spatial region in an image is generally a good measure of image noise. Thus, the squared standard deviation (SSD) is a useful measure of image noise which captures second order correlations among pixels. When the SSD of image values, taken over the spatial neighborhood around a pixel location, and the mean image value for the neighborhood are taken into account in the image blending, the resulting blended image region can more accurately represent noise characteristics of the two source image regions.

The example techniques described herein for respecting the neighborhood variance of image values during blending are presented in the context of splitting a source image region up into two components: a non-noise component and a noise component. The non-noise component generally includes lower-frequency aspects of the image data. These lower-frequency aspects are described as smooth data values, although they need not be smooth in an absolute sense. The noise component generally includes higher-frequency aspects of the image data. These higher-frequency aspects are described as noise data values, although they can include image aspects that actually correspond to the underlying abstract image (e.g., high-frequency image details) or to noise-like image aspects (e.g., film grain).

In alternative implementations, the image data can be split up into more than two image components. A source image region can be split into several frequency levels, and blending can proceed in an iterative fashion on these multiple levels, using the techniques described herein, before combining the blended levels to form the final blended image region. A variety of affine and non-affine interpolations can be used with the different levels in the image decomposition. For example, a linear interpolation can be used for the lowest-frequency component(s), a spherical interpolation can be used for the highest-frequency component(s), and intermediate functions can be used for the intervening component(s).

Given two source image regions, I1 and I2, four different image components can be obtained: (1) a non-noise component $I1_s$, (2) a noise component $I1_n$, (3) a non-noise component $I2_s$, and (4) a noise component $I2_n$. In general, $I_s$ or $(I)_s$ designates a non-noise component for an image region or combination of image regions I, and $I_n$ or $(I)_n$ designates a noise component for the image region I, regardless of how these non-noise and noise components are calculated. As mentioned previously, these four components can be calculated independently of each other. Thus, the non-noise component and the noise component for I1 need not result in exactly I1 when recombined. Multiple techniques for obtaining these components can be used.

These components can then be blended together to form a blended image region I3 as follows:

$$I3 = \text{blend\_1}(I1_s, I2_s, \beta) + \text{blend\_2}(I1_n, I2_n, \beta) \tag{4}$$

$$\text{blend\_1}(I1_s, I2_s, \beta) = (1-\beta)I1_s + \beta I2_s \tag{5}$$

$$\text{blend\_2}(I1_n, I2_n, \beta) = \sqrt{(1-\beta)}I1_n + \sqrt{\beta}I2_n \tag{6}$$

The resulting blended image region I3 has the property that both the neighborhood mean and squared standard deviation are simple linear blends with the same blending parameter, $\beta$:

$$I3_s = \text{blend\_1}(I1_s, I2_s, \beta), \text{ and} \tag{7}$$

$$\Psi(I3) = \text{blend\_1}(\Psi(I1), \Psi(I2), \beta), \tag{8}$$

where $\Psi(I) = (I^2)_s - (I_s)^2$. For example, $\Psi(I)$ can be $<I^2> - <I>^2$, where $<I>$ is defined to be the average of values of I over a neighborhood in the image. Thus, as the blending parameter, $\beta$, varies from zero to one, the noise aspects of the blended image region, as measured by the squared standard deviation of image values, can be made to vary smoothly from $\Psi(I1)$ to $\Psi(I2)$. Likewise, the non-noise aspects of the blended image region can be made to vary smoothly from $I1_s$ to $I2_s$.

If the noise components of the source images, I1 and I2, are correlated, a resulting noise component of the blended image may not vary smoothly from the noise component of I1 to the noise component of I2 as the blending parameter, $\beta$, varies from zero to one. In this case, a decorrelation operation can be performed to reduce correlation before blending. For example, $I1_n$ can be replaced by $I1_n'$, where:

$$I1_n' = I1_n - I2_n \frac{(I1_n I2_n)_s}{(I2_n I2_n)_s} \tag{9}$$

For example:

$$I1_n' = I1_n - I2_n \frac{\langle I1_n I2_n \rangle}{\langle I2_n I2_n \rangle} \tag{10}$$

Or in alternative notation:

$$I1_n' = I1_n - \left[ \frac{DotProduct(I1_n, I2_n)}{\text{Length}(I2_n)^2} \right] I2_n \tag{11}$$

Following this decorrelation operation, the new source image noise component, $I1_n'$, is uncorrelated with $I2_n$.

A non-noise component $I_s$ can be calculated in multiple ways, including as the median image value or the mean image value taken over a spatial neighborhood. Thus, a smooth data value at a pixel location r, where r designates a two-dimensional spatial coordinate of a pixel, r=(x, y), can be calculated as a weighted average of the pixel values in the neighborhood of r. The neighborhood can be an arbitrary set of pixels associated with the pixel r.

Figure 4:
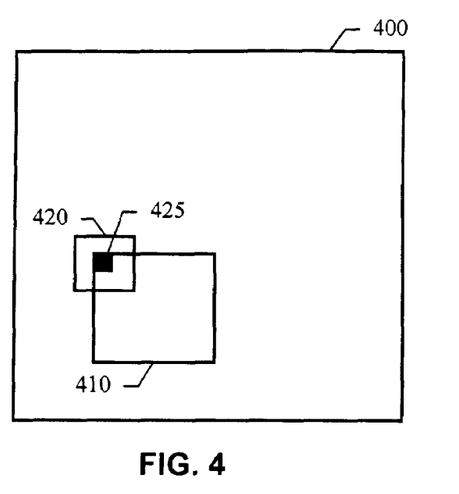
FIGS. 4 and 5 illustrate example techniques for obtaining smooth data values for an image region.
Figure 5:
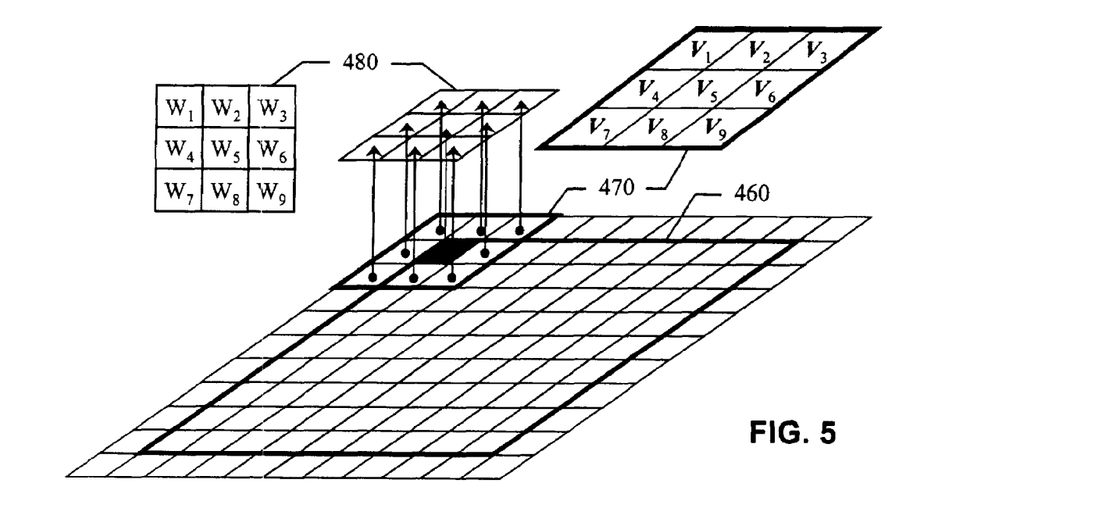

FIGS. 4 and 5 illustrate example techniques for obtaining smooth data values for an image region. For a current pixel 425 in an image region 410 of an image 400, a smooth data value can be generated from a neighborhood of pixels 420 associated with the current pixel 425. The smooth data value can be an average pixel value in a spatial region defined by the neighborhood 420. This average can be a weighted average defined by:

$$\langle V \rangle(r) = \frac{\sum (W(r) \cdot V(r))}{\sum W(r)}, \tag{12}$$

where $<V>(r)$ is the average value V evaluated at pixel r; W(r) are the weights, which can be weights of one; V(r) are the pixel values in the neighborhood 420. This averaging can be repeated for additional pixels in the image region 410 to obtain the smooth data values.

The image 400, the image region 410 and the neighborhood 420 can be any shape or size. FIG. 5 illustrates an example image region 460, a neighborhood 470, and a set of corresponding weights 480. The image region 460 is nine by nine pixels, and the neighborhood 470 is three by three pixels, resulting in nine weights, $W_1, W_2, W_3, W_4, W_5, W_6, W_7, W_8, W_9$, and nine pixel values, $V_1, V_2, V_3, V_4, V_5, V_6, V_7, V_8, V_9$, in the neighborhood 470.

The neighborhood 420 need not be centered over the pixel 425 or even use the pixel value from the pixel 425. In certain implementations, the generation of smooth pixel data need not rely on pixel values from inside the image region 410. For example, the smooth data values can be generated by fitting new pixel values for pixels in the image region 410 to a predefined function using boundary pixel values as boundary conditions for the predefined function. The boundary pixels values come from boundary pixels that lie outside the image region 410.

Such generation of new pixel values, which then constitute the smooth data values for the image region 410, can be performed as an explicit function fitting operation. For example, the image colors inside the region can be fit to a function of x and y coordinates, such as a polynomial. A linear fit, such as, $$I_s(x,y)=I_0+I_1x+I_2y, \quad (13)$$

models the image region as a linear gradient. Higher order polynomials can be used to capture more image detail. The techniques disclosed in the U.S. patent application entitled "Generating Replacement Data Values for an Image Region", filed Nov. 16, 2001, application Ser. No. 09/991,254, can also be used. Any number of available techniques, including median filtering, directional blurring and inpainting techniques, can be used to generate the smooth data values for the image region. The generation of new pixel values can be performed by iteratively applying a kernel to the image data to create the new pixel values. For larger image regions, multi-resolution processing and/or image tiling can be employed to reduce processing time and/or to facilitate use of a storage format (e.g., a tiled backing store).

Once smooth data values have been calculated for an image region, the noise data values can be obtained by subtracting the smooth data values from the original image values in the image region. Alternatively, the noise data values can be calculated directly, and the smooth data values can either be calculated directly or obtained by subtracting the noise data values from the original data values.

The noise data values can be calculated directly as the Laplacian of the image or as a power of the Laplacian:

$$I_n(r)=c\nabla^{2n}I(r), \quad (14)$$

where n is a number greater than or equal to one. The constant c can be a value of −0.25, such as when n is one.

Figure 6:
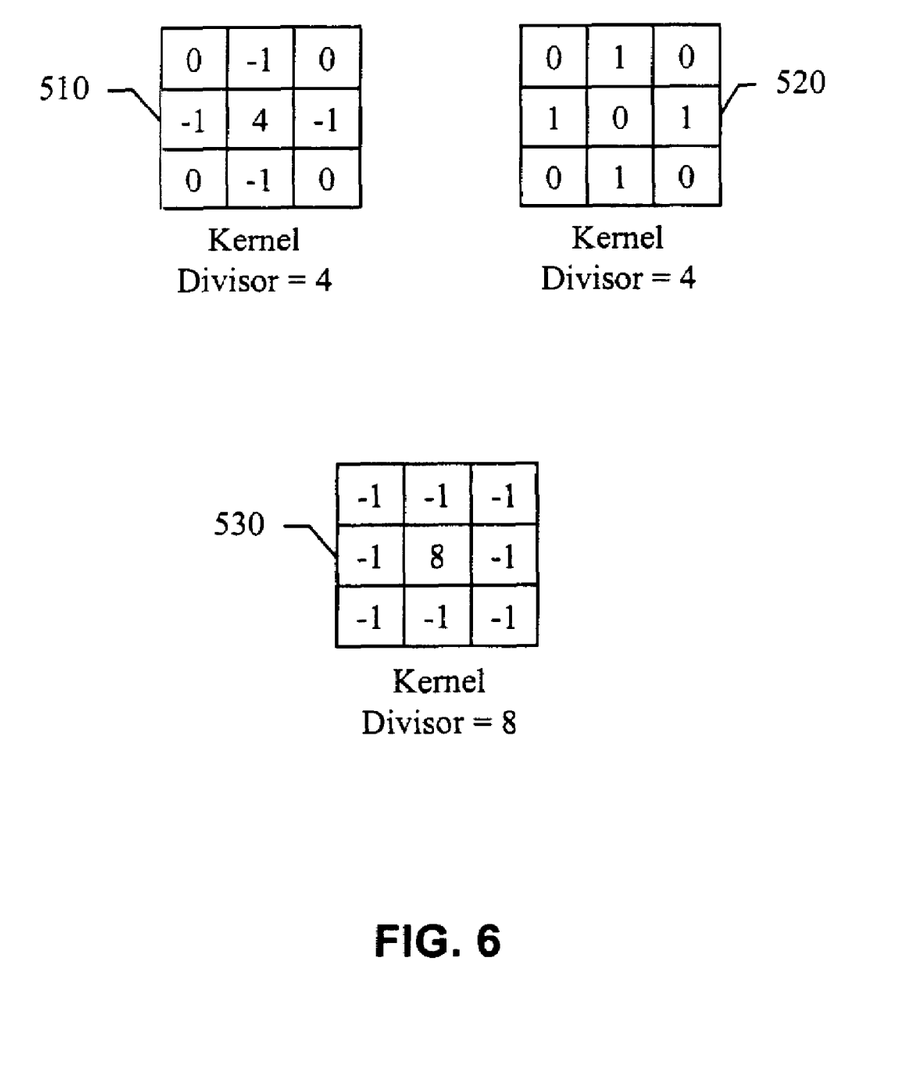
FIG. 6 is an illustration of kernels that can be used to calculated noise data values and smooth data values.

FIG. 6 is an illustration of kernels that can be used to calculate noise data values and smooth data values. The Laplacian can be approximated by applying a 3×3 kernel 510 to the image to calculate the noise data values. Likewise, the smooth data values can be calculated by applying a 3×3 kernel 520, which averages the four-connected neighboring pixel values. Alternatively, the noise data values can be calculated by applying a 3×3 kernel 530 to the image, and the smooth data values can be calculated by subtracting these noise data values from the original data values. The image component generation and blending operations can be adjusted and/or intermixed in order to reduce processing time. For example, the smooth data values can be an indirectly calculated component that is also implicitly calculated during the blend as follows:

$$I3=(1-\beta)I1+\beta I2+b(1-b)I1_n+a(1-a)I2_n \quad (15)$$

where $a=\sqrt{\beta}$, $b=\sqrt{(1-\beta)}$, and the noise data values $I1_n$ and $I2_n$ are calculated using the 3×3 kernel 530.

Regardless of the techniques used to generate the smooth data values, when the noise data values are obtained by subtracting the smooth data values from the original image values, a stochastic selection technique can be used to obtain the noise data values. Referring again to FIG. 4, for the current pixel 425 in the image region 410, a noise data value can be generated by subtracting the calculated smooth data value from a pixel value randomly selected from a neighborhood associated with the current pixel 425, which can be the neighborhood 420.

This introduction of a stochastic element to the noise determination can avoid problems that can be created by correlations between the source images and can result in a more natural looking blend. In the context of image cloning, which involves a blended copy of one image region into another, this introduction of randomness can help to reduce correlation artifacts that can otherwise be introduced in the copying process. Special attention should be paid to the cases where the blend parameter is zero or one in order to get the appropriate original image values. When using this stochastic approach, it may be preferable to not use the mean or median image values as the smooth data values. Moreover, this stochastic approach may be undesirable when the disclosed techniques are used to preserve high-frequency image details.

The invention can be implemented in digital electronic circuitry, or in computer hardware, firmware, software, or in combinations of them. Apparatus of the invention can be implemented in a software product (e.g., a computer program product) tangibly embodied in a machine-readable storage device for execution by a programmable processor; and processing operations of the invention can be performed by a programmable processor executing a program of instructions to perform functions of the invention by operating on input data and generating output. The invention can be implemented advantageously in one or more software programs that are executable on a programmable system including at least one programmable processor coupled to receive data and instructions from, and to transmit data and instructions to, a data storage system, at least one input device, and at least one output device. Each software program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory, a random access memory and/or a machine-readable signal (e.g., a digital signal received through a network connection). Generally, a computer will include one or more mass storage devices for storing data files; such devices include magnetic disks, such as internal hard disks and removable disks, magneto-optical disks, and optical disks. Storage devices suitable for tangibly embodying software program instructions and data include all forms of non-volatile memory, including by way of example semiconductor memory devices, such as EPROM (electrically programmable read-only memory), EEPROM (electrically erasable programmable read-only memory), and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD (liquid crystal display) screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims.

What is claimed is:

1. A method comprising: combining a first image region and a second image region to form a blended image region having a neighborhood mean and a neighborhood variance, at each of multiple points in the blended image region, that are linear blends of corresponding neighborhood means and variances from the first and second image regions using a common blending parameter.

2. The method of claim 1, wherein combining the first image region and the second image region comprises forming a blended image region having, at each point in the blended image region, a neighborhood mean and a neighborhood variance that are linear blends using the common blending parameter.

3. A software product tangibly stored on a computer-readable medium, the software product comprising instructions operable to cause a programmable processor to perform operations comprising: combining a first image region and a second image region to form a blended image region having a neighborhood mean and a neighborhood variance, at each of multiple points in the blended image region, that are linear blends of corresponding neighborhood means and variances from the first and second image regions using a common blending parameter.

4. The software product of claim 3, wherein combining the first image region and the second image region comprises forming a blended image region having, at each point in the blended image region, a neighborhood mean and a neighborhood variance that are linear blends using the common blending parameter.

5. An apparatus comprising: means for receiving an image; means for displaying the image; and means for combining a first image region and a second image region to form a blended image region including a neighborhood mean and a neighborhood variance that are linear blends of the first and second image regions using a common blending parameter.

6. The apparatus of claim 5, wherein the means for combining the first image region and the second image region comprises means for forming a blended image region having, at each point in the blended image region, a neighborhood mean and a neighborhood variance that are linear blends of corresponding points in the first and second image regions using the common blending parameter.

7. A system comprising: a data storage system; at least one input device; at least one output device; and at least one programmable processor coupled to receive information from, and to transmit information to, the data storage system, the at least one input device, and the at least one output device;

wherein the data storage, system includes a machine-readable medium tangibly embodying a software product comprising instructions operable to cause the at least one programmable processor to perform operations comprising combining a first image region and a second image region to form a blended image region having a neighborhood mean and a neighborhood variance, at each of multiple points in the blended image region, that are linear blends of corresponding neighborhood means and variances from the first and second image regions using a common blending parameter.

8. The system of claim 7, wherein the combining operation comprises forming a blended image region having, at each point in the blended image region, a neighborhood mean and a neighborhood variance that are linear blends using the common blending parameter.

* * * * *

UNITED STATES PATENT AND TRADEMARK OFFICE
CERTIFICATE OF CORRECTION

| | | |
|---|---|---|
| PATENT NO. | : 7,454,087 B1 | Page 1 of 1 |
| APPLICATION NO. | : 11/623715 | |
| DATED | : November 18, 2008 | |
| INVENTOR(S) | : Gregg D. Wilensky et al. | |

It is certified that error appears in the above-identified patent and that said Letters Patent is hereby corrected as shown below:

Claim 7:
        column 12, line 19:
            delete "storage," and replace with --storage--

Signed and Sealed this
Second Day of October, 2012

David J. Kappos
*Director of the United States Patent and Trademark Office*